Patented Feb. 12, 1935

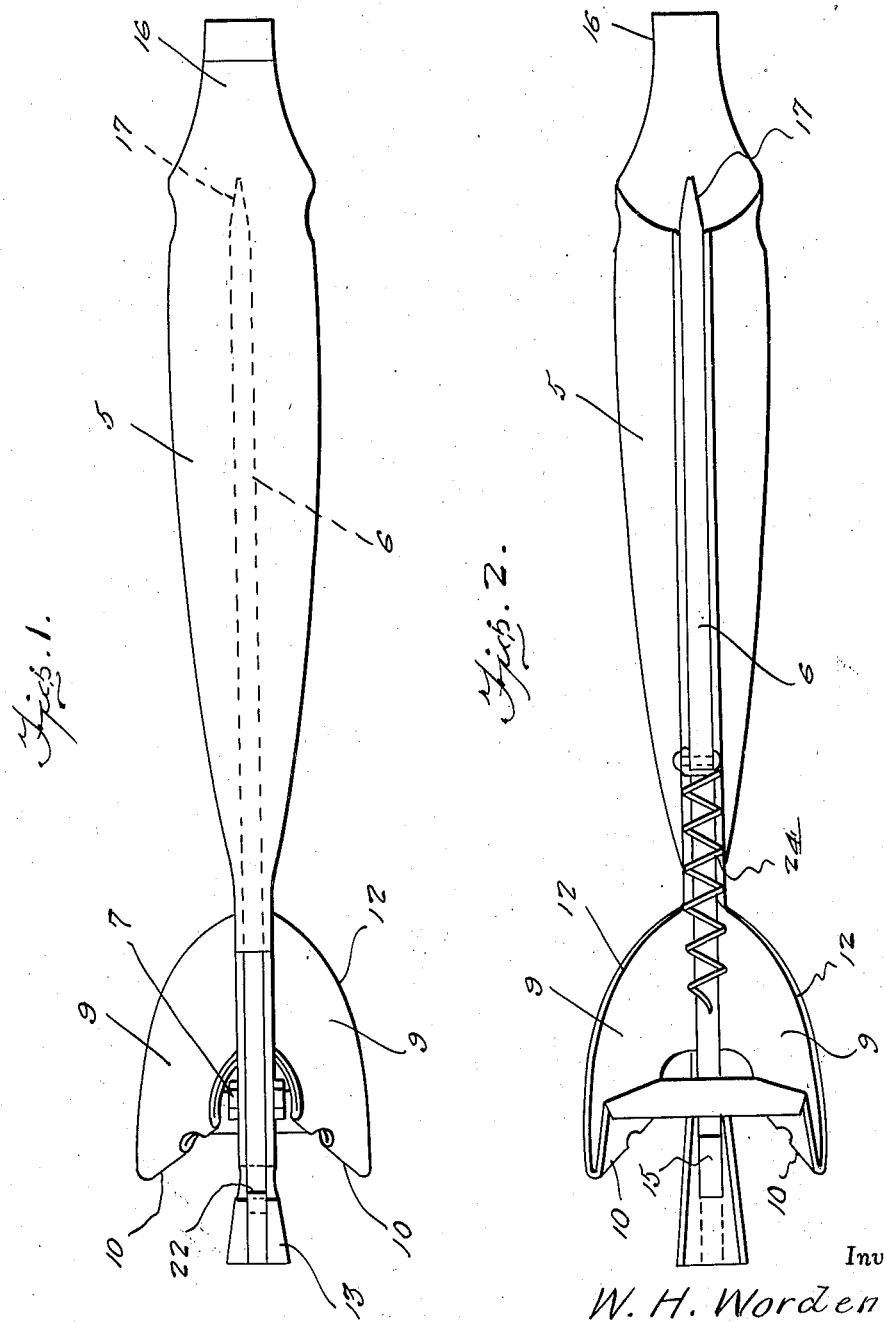

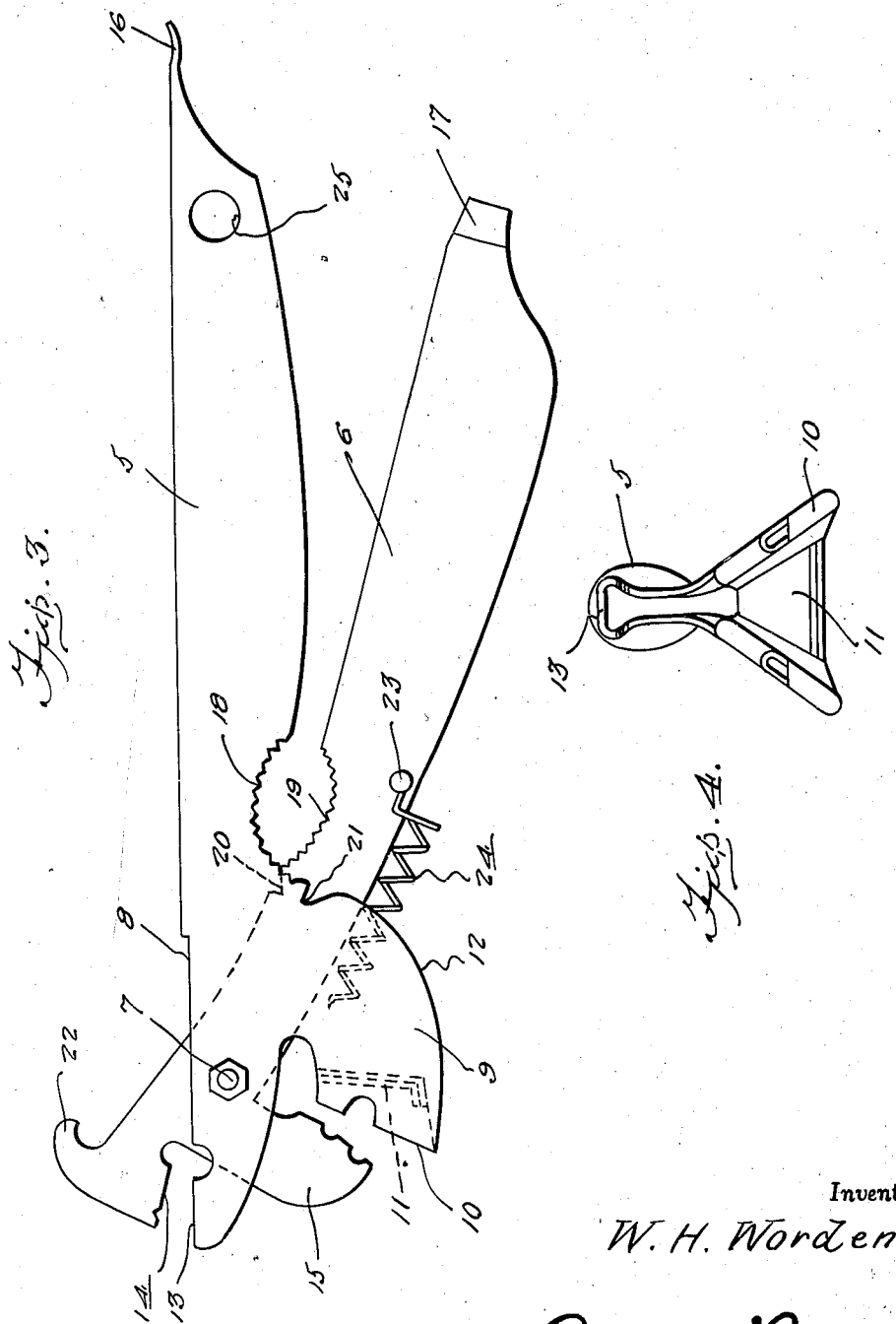

1,991,307

UNITED STATES PATENT OFFICE 1,991,307

UNIVERSAL HANDLE FOR KITCHEN WARE

William H. Worden, Harrisonburg, La.

Application September 23, 1933, Serial No. 690,709

2 Claims. (Cl. 294—31)

This invention relates to removable handles for pots, pans and other kitchen ware and has as its object the provision of such a handle that may be instantly applied and removed from any size or shape of kitchen utensil in ordinary use.

A further object of the invention is to provide a handle of the character above mentioned which is also equipped for use as a combination tool, including in its construction means whereby the handle may be used as a bottle opener and pot hook, screw cap remover, nut cracker, wire cutter, cork screw and nut pick, screw driver and ice pick, steak beater and ice breaker, stove lid lifter, as well as for use in handling pie and cake pans whether the same be provided with or without a rim.

The invention together with its objects and advantages will be best understood from a study of the following description, taken in connection with the accompanying drawings wherein:

Figure 1 is a top plan view of the handle.

Figure 2 is a bottom plan view thereof.

Figure 3 is a side elevational view of the handle, and

Figure 4 is an end elevational view of one of the levers.

Referring to the drawings by reference numerals it will be seen that the handle comprises a pair of levers 5 and 6 respectively pivotally connected together adjacent one end as at 7.

The lever 5 is formed from a single blank of suitable metal, such as cast metal or pressed aluminum, or steel cut, shaped and pressed to provide a handle which is substantially channel shaped in cross section and provided at its pivoted end, in the top of the handle, with a slot 8 through which extends the pivoted end of the handle 6. At said end and rearwardly of the pivot 7 the sides of the handle 5 are provided with continuations 9 that extend forwardly and their forward portions are folded upon themselves as at 10, with the inwardly folded portions merging into a connecting web 11. The extensions 9 are provided with arcuate cutting edges 12 and said parts 9 and web 11 form a meat tenderer and ice breaker as is thought apparent.

At the slotted end thereof the lever 5 also forms a fixed jaw 13 that is cooperable with a jaw 14 provided on the pivoted end of the handle 6 for gripping therebetween one edge of a rimless pan, skillet lids and for cooperation when the device is used for general pliers purposes.

The portions 10 and 11 of the hereinbefore described meat tenderer also constitutes a jaw cooperable with a jaw 15 formed on the pivoted end of the handle 6 for gripping therebetween the rim of pots, pans and the like having relatively deep rims. In this connection it will be apparent that the jaws formed by the parts 10 and 11 will engage the exterior surface of the rim of the pot while the jaw 15 will engage the interior side of such rim so that the pan will be securely engaged by the handle; and the handle of the invention thus provides an efficient medium for handling hot pans and the like.

At the free end thereof the top of the lever 5 is extended beyond the sides of the lever and suitably shaped to provide as at 16 a lip to engage a stove lid so that the device may be also used as a stove lid lifter.

At its free end the handle 6 is formed as at 17 to provide a screw driver.

Rearwardly of the pivot 7 the sides of the lever 5 are provided with arcuate notches, and the arcuate edges formed by the notches are serrated as at 18. On the edge thereof confronting the lever 5, lever 6 opposite the serrated portions 18 of lever 5 is provided with an arcuate serrated edge portion 19 cooperable with the serrated portions 18 for gripping a screw cap so that the tool may be used as a screw cap remover, and these parts 18, 19 also cooperate for engaging therebetween a nut or the like so that the tool may also be used as a nut cracker.

The notches 19 of the lever 6 at its forward end merge into a sharpened edge 20 that is cooperable with transversely alined notches 21 provided at the junction of the extensions 9 with the sides of the lever 5 in a manner to permit the use of the tool as a wire cutter.

At the jaw equipped end 13 thereof the lever 6 is provided with a hook 22 which will be found useful as a pot hook and bottle opener.

Pivoted to an intermediate portion of the lever 6 as at 23 is a combined corkscrew and nut picker 24.

The lever 5 at its free end has either or both sides thereof provided with an aperture 25 to accommodate a nail or the like whereby the tool may be suspended from any suitable support.

From the above it will be apparent that I have provided a universal handle that can be instantly applied to pots, kettles, pie tins, pans and other kitchen ware, and with which is combined a combination tool presenting for ready use any one of a number of different tools often required around the kitchen.

Having thus described my invention, what I claim as new is:

1. A device of the class described comprising an elongated member of substantially inverted channel shape and having a slot in its upper edge adjacent the front end thereof, a second elongated member having its front end passing through the slot, a pivot pin passing through the two members adjacent the front ends thereof, downwardly and forwardly extending curved parts formed on the lower edges of the side members of the channel member and slightly rearwardly of the pivot pin, the front ends of said depending parts being bent inwardly and rearwardly, a substantially straight web connecting the rear ends of said bent parts together to form a jaw which is spaced rearwardly from the front ends of said depending parts, and a depending jaw forming part on the second member which is pivoted to the first member.

2. A device of the class described comprising an elongated member of substantially inverted channel shape and having a slot in its upper edge adjacent the front end thereof, a second elongated member having its front end passing through the slot, a pivot pin passing through the two members adjacent the front ends thereof, downwardly and forwardly extending curved parts formed on the lower edges of the side members of the channel member and slightly rearwardly of the pivot pin, the front ends of said depending parts being bent inwardly and rearwardly, a substantially straight web connecting the rear ends of said bent parts together to form a jaw which is spaced rearwardly from the front ends of said depending parts, a depending jaw forming part on the second member which is pivoted to the first member, the rear edge of said depending jaw part and the front ends of the depending forwardly curved parts having notches therein.

WILLIAM H. WORDEN.